United States Patent Office 3,262,845
Patented July 26, 1966

3,262,845
CONTROL OF FUNGI ON PLANTS WITH
1-PHENYLTHIOSEMICARBAZIDES
Christoffel Willem Pluijgers, Utrecht, Netherlands,
  assignor to North American Philips Company, Inc.,
  New York, N.Y., a corporation of Delaware
No Drawing. Filed Sept. 24, 1962, Ser. No. 225,895
Claims priority, application Netherlands, Sept. 22, 1961,
  269,542
5 Claims. (Cl. 167—30)

It is known that thiosemicarbazide has fungicidal activity. The activity of 2-phenylthiosemicarbazide against a number of moulds has been described.

The fungicidal activity of 2-phenylthiosemicarbazide, however, is not sufficient for combating moulds, for example, on living plants in practice. In addition, this compound is phytotoxic.

Therefore it was surprising to find that the isomeric 1-phenylthiosemicarbazide has a far greater fungicidal activity and is not phytotoxic. The fungicidal activity is such that this substance is suitable as the active ingredient in a composition for combating moulds, especially moulds on living plants, in practice. It has also been found that 1-phenylthiosemicarbazides in which the phenyl-radical is substituted by chlorine, lower alkyl-, alkoxy- or alkyl-mercapto-groups have a satisfactory fungicidal activity.

The invention relates to a composition for combating moulds comprising as an active ingredient a compound of the general formula

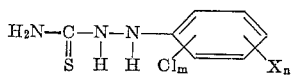

where X represents an alkyl-group containing from 1 to 4 carbon atoms, an alkoxy-group containing from 1 to 4 carbon atoms or a mercapto-alkyl-group containing from 1 to 4 carbon atoms, $m=0$ to 1 and $n=0$ to 3.

Especially the compounds in which the para-position of the benzene nucleus is occupied by one of the said groups or by hydrogen and in particular 1-(4-methoxyphenyl)-, 1-(4-methylphenyl)- and pre-eminently 1-(4-chlorophenyl)-thiosemicarbazide and 1-phenylthiosemicarbazide have a satisfactory fungicidal activity.

For combating moulds on living plants in practice it is of importance that 1-phenylthiosemicarbazide has not only a very satisfactory contact activity but also a considerable systemic fungicidal activity and is not phytotoxic.

The activity of the compounds in accordance with the invention was determined with respect to various species of moulds, for example *Botrytis fabae, Erysiphe graminis, Erysiphe cichoracearum* and *Phytophthora infestans*. The compounds are also active against bacteria.

The contact activity of 1-phenylthiosemicarbazide with respect to *Phytophthora infestans* proved to be more than 30 times that of the isomeric 2-phenylthiosemicarbazide.

The invention also relates to the production of a composition for combating moulds, particularly on living plants, by mixing an active ingredient with a solid or liquid inert carrier, if required with the use of a surface-active substance, a dispersion agent or an adhesive, and it is characterized in that a compound of the above-mentioned formula is used as the active ingredient.

The invention further relates to methods of combating moulds and for this purpose in particular to the treatment of living plants and seeds. Examples I and II illustrate the combating of moulds on living plants.

Example I

*Phytophthora infestans* on living potato plants (Bintje) was combated in field tests.

The plants were sprayed with suspensions of 1-phenylthiosemicarbazide three times and after the second and the third spraying the plants were infected with the mould by spraying of suspensions comprising about 3000 spores $cm.^3$.

The suspension of the fungicide used contained 98% of water and 2% by weight of a composition comprising:
50% by weight of 1-phenylthiosemicarbazide,
7% by weight of ligninesulphonate-sodium,
3% by weight of sodium lauryl sulphate,
40% by weight of diatomite.

The amount of 1-phenylthiosemicarbazide as applied on the three test-fields corresponded respectively to 0.8, 1.6 and 3.2 kg. per hectare.

The plants of the first field showed slight infection, the others were practically free of infection, whereas a field which was not treated with the composition showed very severe infection.

Example II

*Venturia inaequalis* on living young plants of apple (East Malling type II) were combated with suspensions in water comprising 0.2% by weight of the composition of Example I.

The plants had been infected with a suspension of the parasite in water.

The young apple plants were cultivated in a greenhouse.

After a week no, or hardly any, infection was present; no phytotoxicity was established.

The production of the compositions for combating moulds on living plants in accordance with the invention may be effected in the manners known for such compositions or analogous manners.

A dust may be produced by grinding two parts by weight of 1-phenylthiosemicarbazide, 12 parts by weight of chalk and 80 parts by weight of dolomite together to an average particle size of about 10 microns.

A wettable powder may be produced by mixing 20 parts by weight of 1-(4-chlorophenyl)thiosemicarbazide, 75 parts by weight of attapulgite, 2 parts by weight of oleylamidomethyltaurate and 3 parts by weight of sodiumligninsulphonate and grinding the mixture to a mean particle-size of about 10 microns.

A miscible oil may be produced by mixing 10 parts by weight of 1-(4-methoxyphenyl)thiosemicarbazide, 50 parts by weight of acetone, 15 parts by weight of methylethylketone, 20 parts by weight of xylene and 5 parts by weight of polyoxyethylene-sorbitan adipic acid ester. An emulsion is obtained by mixing a miscible oil with water.

A seed disinfactant may be produced by mixing 5 parts by weight of 1-(4-methylphenyl)thiosemicarbazide with 93 parts by weight of kaolin and 2 parts by weight of an adhesive, for example, spindle oil.

For the production of the said powders and dusts other inert carriers may also be used, for example dolomite, kaolin or pipe-clay; for the production of miscible oils other inert diluents may be used, for example benzene, toluene or cyclohexanone. Other surface active substances than those referred to may also be used.

What is claimed is:

1. A method of combating fungi on living plants and seeds comprising contacting the fungi thereon with a fungicidally effective but a non-phytotoxic amount of a compound of the formula:

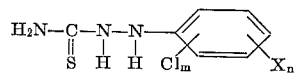

wherein X is a member of the group consisting of alkyl of 1 to 4 carbon atoms, alkoxy of 1 to 4 carbon atoms and mercapto alkyl of 1 to 4 carbon atoms, $m$ is an integer from 0 to 1 inclusive and $n$ is an integer from 0 to 3 inclusive.

2. A method of combating fungi on living plants and seeds comprising contacting the fungi thereon with a fungicidally effective but non-phytotoxic amount of 1-(4-chlorophenyl)thiosemicarbazide.

3. A method of combating fungi on living plants and seeds comprising contacting the fungi thereon with a fungicidally effective but non-phytotoxic amount of 1-(4-methoxyphenyl) thiosemicarbazide.

4. A method of combating fungi on living plants and seeds comprising contacting the fungi thereon with a fungicidally effective but non-phytotoxic amount of 1-(4-methylphenyl) thiosemicarbazide.

5. A method of combating fungi on living plants and seeds comprising contacting the fungi thereon with a fungicidally effective but non-phytotoxic amount of 1-phenylthiosemicarbazide.

References Cited by the Examiner

UNITED STATES PATENTS

| | | | |
|---|---|---|---|
| 2,403,495 | 7/1946 | Bowen | 167—30 |
| 2,911,336 | 11/1959 | Urbschat et al. | 167—30 |
| 3,074,844 | 1/1963 | Ogita | 167—30 |

FOREIGN PATENTS

| | | |
|---|---|---|
| 541,860 | 6/1957 | Canada. |
| 821,401 | 10/1959 | Great Britain. |
| 87,658 | 3/1958 | Netherlands. |

OTHER REFERENCES

Chem. Abst., vol. 53, entry 19689b, 1959, citing Koshkin, Trady Leningrad. Tekhnol. Inst., Pishchevoi Prom. (15), 96–100 (1958).

Chem. Abst., vol. 54, entry 16282e, 1960, citing Koshkin, Izvest. Vysshikh Ucheb. Zavedenii, Khim. i Khim. Tekhnol. (3), No. 1, 56–8 (1960).

Chem. Abst., vol. 55, entry 19607a, 1961, citing Komatsu, Nippon Kagaku Zasshi (82), 456–9 (1961).

Chem. Abst., vol. 57, entry 6431c, 1962, citing Zsolnai, Biochem. Pharmacol. (11), 271–297 (1962).

Mautner et al., Antibiotics and Chemotherapy, vol. 6, No. 1, pp. 51–55, January 1956.

LEWIS GOTTS, *Primary Examiner*.

JULIAN S. LEVITT, R. HUFF, *Examiners*.